J. E. VAN DEVENTER AND L. SWANK.
AUTOMOBILE LOCK.
APPLICATION FILED JAN. 23, 1919.
1,329,644.
Patented Feb. 3, 1920.
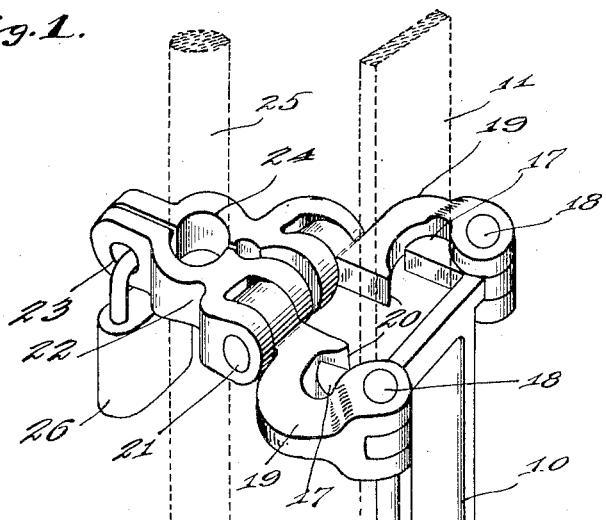
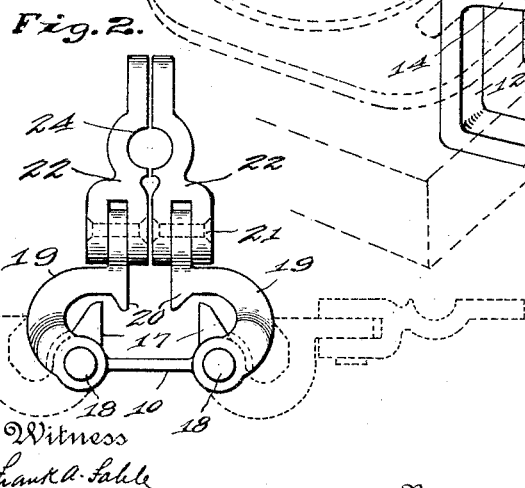
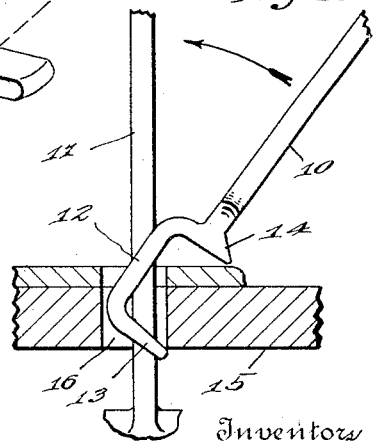
Inventors
James E. Van Deventer
Lafe Swank,
Attorneys

UNITED STATES PATENT OFFICE.

JAMES E. VAN DEVENTER AND LAFE SWANK, OF ANDERSON, INDIANA, ASSIGNORS TO DWIGGINS WIRE FENCE COMPANY, OF ANDERSON, INDIANA, A CORPORATION OF INDIANA.

AUTOMOBILE-LOCK.

1,329,644.              Specification of Letters Patent.         Patented Feb. 3, 1920.

Application filed January 23, 1919. Serial No. 272,611.

*To all whom it may concern:*

Be it known that we, JAMES E. VAN DEVENTER and LAFE SWANK, citizens of the United States, residing at Anderson, in the county of Madison and State of Indiana, have invented a new and useful Automobile-Lock, of which the following is a specification.

The object of my invention is to produce a locking device, for automobiles, of such character that it may be easily applied to simultaneously lock the emergency brake lever in braking position and the gear shift lever in neutral.

The accompanying drawings illustrate my invention. Figure 1 is a perspective view of my device, the associative locked-parts being indicated in dotted lines; Fig. 2 is a plan; and Fig. 3 a fragmentary detail showing the manner of insertion.

In the drawings, 10 indicates the main shank of my device, designed to lie alongside the brake lever 11 and provided with two feet 12, each having toe 13 and heel 14, the toes and heels being so spaced as to underlie and overlie the floor 15 when the feet are projected through the brake-lever slot 16. The feet 12 are spaced apart and offset from the plane of shank 10 so as to straddle lever 11.

At its upper end shank 10 is provided with two shoulders 17, 17, arranged to flank lever 11.

Pivoted at 18 to the upper end of shank 10, adjacent each shoulder 17, and on an axis substantially parallel with the shank, is a curved and jointed arm 19 having a finger 20 formed to engage lever 11 in opposition to shank 10. Carried by each arm 19, preferably on an axis 21, at right angles to the axis 18, is a member 22 provided near its end with an eye 23 and at an intermediate point with a semi-cylindrical seat 24 to receive the gear-shifting lever 25. Eyes 23 are formed to receive a padlock 26.

At the forward side of shank 10, the head 14 is extended, as at 14', so as to overlie floor 15 to a greater extent parallel with slot 16, and thus more firmly hold lever 11.

In use, lever 11 has been swung to the rear so as to set the brake, and lever 24 having been brought to "neutral," feet 12 are straddled upon lever 10; toes 13 projected through slot 16; and shank 10 swung up alongside lever 11. Thereupon, arms 19 are swung around so as to embrace levers 11 and 25 and the ends of members 22 fastened together, thereby firmly holding levers 11 and 25 in position to prevent the car from being moved or the engine power applied thereto, thus preventing theft of the car either under its own power or by towing.

I claim as my invention:

1. An automobile lock comprising a main shank, having a pair of lever-straddling feet adapted to be retained in the lever floor-slot, and a pair of arms pivoted on the main shank and formed to embrace said lever and an adjacent controlling lever of the automobile and to be locked in embracing position.

2. An automobile lock comprising a main shank, having a pair of lever-straddling feet, and a pair of arms pivoted on the main shank and formed to embrace said lever and an adjacent controlling lever of the automobile and to be locked in embracing position.

3. An automobile lock comprising a main shank, having a pair of separated feet to straddle the brake lever of an automobile, said feet having heels and toes arranged to overlie and underlie the floor adjacent the brake lever, and a pair of arms pivoted on the main shank and formed to embrace the brake lever and an adjacent transmission lever and to be locked in embracing position.

4. An automobile lock comprising a main shank, having a pair of separated feet to straddle the brake lever of an automobile, and a pair of arms pivoted on the main shank and formed to embrace the brake lever and an adjacent transmission lever and to be locked in embracing position.

5. An automobile lock comprising a main shank, having a pair of separated feet to straddle the brake lever of an automobile, said feet having heels and toes arranged to overlie and underlie the floor adjacent the brake lever, a pair of arms pivoted on the main shank and formed to embrace the brake lever, transmission lever embracing members pivoted to said arms, and means by which the lever-embracing elements may be locked in embracing position.

6. An automobile lock comprising a main shank, having a pair of separated feet to straddle the brake lever of an automobile, a pair of arms pivoted on the main shank and formed to embrace the brake lever, transmission-lever embracing members pivoted to said arms, and means by which the lever-embracing elements may be locked in embracing position.

In witness whereof we have hereunto set our hands at Anderson, Indiana, this 18th day of January, A. D one thousand nine hundred and nineteen.

JAMES E. VAN DEVENTER.
LAFE SWANK.